No. 700,251.  
Patented May 20, 1902.

A. O. SMITH.
LOCK FOR ADJUSTABLE BALL BEARING CONES.
(Application filed June 10, 1901.)

(No Model.)

Witnesses  
E. B. Gilchrist  
H. M. Wise

Inventor,  
Arthur O. Smith  
By his Attorneys,  
Thurston & Bates

UNITED STATES PATENT OFFICE.

ARTHUR O. SMITH, OF MILWAUKEE, WISCONSIN, ASSIGNOR TO AUTOMOBILE AND CYCLE PARTS COMPANY, OF CLEVELAND, OHIO, A CORPORATION OF NEW JERSEY.

LOCK FOR ADJUSTABLE BALL-BEARING CONES.

SPECIFICATION forming part of Letters Patent No. 700,251, dated May 20, 1902.

Application filed June 10, 1901. Serial No. 63,935. (No model.)

*To all whom it may concern:*

Be it known that I, ARTHUR O. SMITH, a citizen of the United States, residing at Milwaukee, in the county of Milwaukee and State of Wisconsin, have invented a certain new and useful Improvement in Locks for Adjustable Ball-Bearing Cones, of which the following is a full, clear, and exact description, reference being had to the accompanying drawings.

The invention relates to means for positively locking the adjustable cone of a ball-bearing in any position into which it is necessarily moved to secure the desired adjustment.

The invention consists in the construction and combination of parts hereinafter described, and definitely set forth in the claim.

Figure 3:
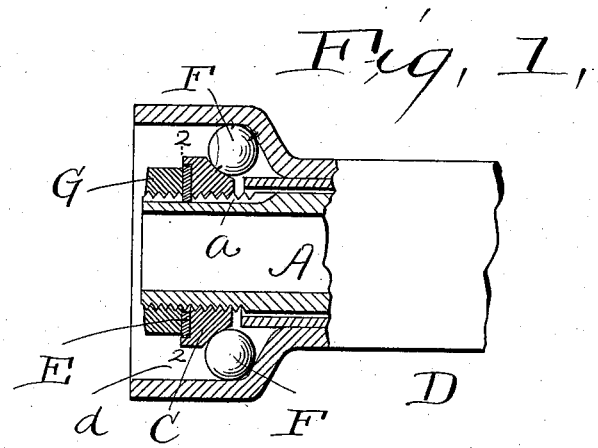
Figure 2:
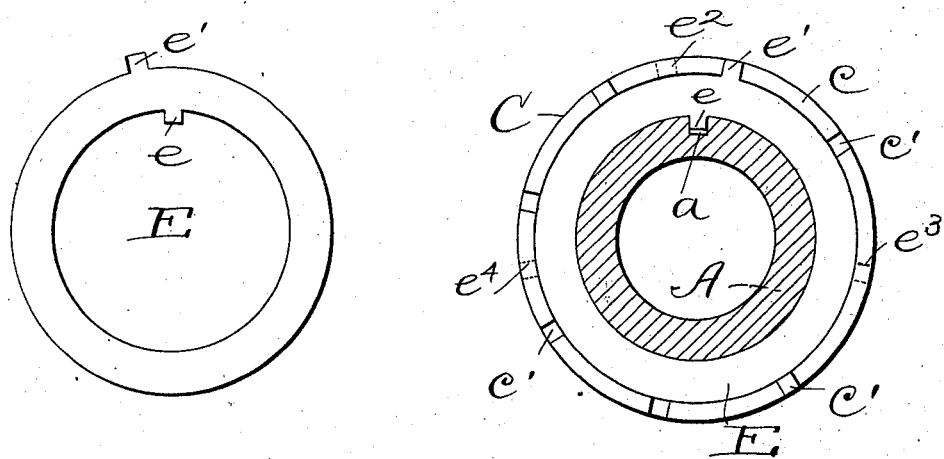

In the drawings, Figure 1 is a side view, partly in longitudinal section, of one end of a ball-bearing embodying my invention. Fig. 2 is an enlarged sectional view on line 2 2 of Fig. 1, and Fig. 3 is an end view of the locking-washer.

Referring to the parts by letters, A represents the axle, which may have at or near one end the customary fixed cone, which is not shown.

C represents the adjustable cone, which is screwed onto the axle.

D represents the hub, on which are two cups $d$, (of which only one is shown,) between which and said cone the balls F are confined.

By turning the cone C in one direction or the other upon the axle the pressure on the balls is increased or diminished.

The cone C has on its large end a concentric cylindrical flange $c$, in which are formed a plurality of notches $c'$, these notches being of any desired number and being arranged at equal angular distances apart.

In the axle A is a longitudinal groove $a$. A locking-washer E embraces the axle A and has an inwardly-projecting tongue $e$, which enters said groove $a$, whereby the rotation of the washer upon the axle is prevented. This washer is of such diameter that it will go inside of said flange $c$, and it has an outwardly-projecting tongue $e'$, which engages with one of the notches $c'$, and thereby prevents the rotation of the cone so long as this engagement is maintained. A nut G, which screws onto the axle, is provided for maintaining this engagement.

In order that it shall not be necessary to cut as many notches $c'$ in the adjustable cone as there are positions in which it is desired to lock said cone, the two tongues $e\ e'$ of the locking-washer are arranged in certain relative positions. As shown, the angular distance between these two tongues is one-quarter of the angular distance between two adjacent notches on the cone. If, therefore, it is desirable to change the position of the cone only so much as results from turning that cone in either direction one-half of the angular distance between two adjacent notches therein, the washer E is taken off of the axle and turned over and then replaced with the tongue $e$ in the groove in the axle. The tongue in dotted lines is indicated by $e^2$ and shows the new position of tongue $e'$. By turning the cone now in either direction one-half of the angular distance between two adjacent notches thereon a notch is brought into line with the tongue $e'$, which may then be forced into said notch and prevent further rotation of the cone.

It is not necessary that the two tongues $e\ e'$ shall be separated by an angle equal to one-quarter of the angle between two adjacent notches, because the same result exactly can be secured if the tongues are so placed that the angular distance between them will be indicated by the following formula—to wit, $X\,a \pm \frac{a}{4}$. In the foregoing formula, $a$ indicates the angular distance between the two adjacent notches on the cone, and X represents any integer. The tongue in dotted lines indicated by $e^3$ shows one position in which this external tongue may be placed relative to tongue $e$, and the tongue in dotted lines indicated by $e^4$ shows the position said tongue $e^3$ will occupy when the washer is turned over.

It is not, in fact, absolutely necessary that the last member of said formula be exactly one-quarter of the angular distances between two adjacent notches. If it is substantially one-quarter of such angle, the mode of operation will be the same; but it is only when it is exactly one-quarter that when the washer is turned over the cone may be turned exactly the same distance in both directions to bring it to a locking position.

Having described my invention, I claim—

The combination of an axle having a longitudinal groove and an adjustable cone screwed on said axle and having a plurality of equally-spaced notches, with a locking-washer having an inwardly-extended tongue, which takes into said groove, and an outwardly-extended tongue adapted to engage with one of said notches, the angular distance between said tongues being substantially equal to the angle represented by the following formula: $X\, a \pm \frac{a}{4}$, substantially as and for the purpose specified.

In testimony whereof I hereunto affix my signature in the presence of two witnesses.

ARTHUR O. SMITH.

Witnesses:
E. H. DADMUR,
C. A. BELL.